United States Patent Office 2,829,160
Patented Apr. 1, 1958

2,829,160

PURIFICATION OF TEREPHTHALIC ACID

Carlyle J. Stehman and Clarence E. Hieserman, Decatur, Ala., assignors to The Chemstrand Corporation, Decatur, Ala., a corporation of Delaware No Drawing. Application October 12, 1953
Serial No. 385,702

4 Claims. (Cl. 260—525)

This invention relates to a process of purification of terephthalic acid. More particularly, the invention is concerned with a new method of preparing pure terephthalic acid from impure mixtures which are normally obtained in the manufacture thereof. Specifically, the invention relates to a method of separating terephthalic acid from impure mixtures thereof which usually contain such impurities as isophthalic acid, para-toluic acid, and the like.

In recent years terephthalic acid has increased considerably in commercial importance in view of the fact that the acid, in a pure state, is capable of entering into a condensation polymerization with various glycols, such as ethylene glycol and the like, to produce compositions which are capable of being formed into fibers and filaments which are capable of being cold-drawn and which have many commercial applications. However, in order to obtain these desirable commercial products it is necessary that terephthalic acid in a pure state be employed. Due to the limited solubility of terephthalic acid, it has been difficult to effect purification by normal crystallization procedures. For example, terephthalic acid and para-toluic acid are exceedingly difficult to separate because of their similarity with respect to chemical and physical properties. Their high boiling points and slight solubility make physical separations difficult. Chemical methods of separation which have been employed have not been effective principally because of economic reasons.

Similarly, the usual physical and chemical means of separation are not effective for separating isophthalic from terephthalic acid because of their similar properties.

The present most widely used procedure for the purification of terephthalic acid is to convert the acid to the ester. The esters have a much wider range of solubility and are much more easily purified. For example, one method of separating terephthalic acid from isophthalic acid has involved forming the alkyl esters of the acids, fractionating the esters and saponifying the ester fractions. Ordinarily, the dimethyl esters are used to effect separation in this manner. However, this method of ester conversion on a commercial scale is expensive due to the requirement of stainless steel pressure equipment, low equipment capacity, etc. Therefore, there has been a great desire in the art to find other means for the purification of terephthalic acid which are simpler in their operation and more beneficial from an economic standpoint.

Accordingly, it is a primary object of the present invention to provide a new method for purifying terephthalic acid which overcomes the difficulties heretofore encountered in employing prior art processes. Other objects and advantages of the instant invention will in part appear and will in part be apparent from the description thereof hereinafter.

In general, the objects of the present invention are accomplished by converting the crude or impure terephthalic acid to certain amine salts which produces a derivative of the acid which may, if desired, be further purified by crystallization. The amine salt is dissolved in a solvent therefor and the resultant solution made acid thereby converting the amine salt of terephthalic acid to a purified, insoluble terephthalic acid which is readily separable by filtration. The purified terephthalic acid is thereafter washed with water, or other suitable solvent, to remove excess acid and amine salt corresponding to the acid added to acidify the solution of amine salt of terephthalic acid.

It has been found that conversion of the crude terephthalic acid to certain amine salts effects separation from the monobasic impurities that may be present. While terephthalic acid is very difficult to purify by crystallization, due to its insolubility, the amine salts thereof may be readily recrystallized from polar solvents. Crystallization of the amine salts of terephthalic acid from polar solvents effects separation of the same from dibasic impurities, such as the salts of isophthalic acid and toluic acid. When recrystallizing the amine salts of terephthalic acid the isolated salt is dissolved in a polar solvent at elevated temperatures, usually in the range of 80° to 150° C., and thereafter the solution is allowed to cool whereupon the purified amine salt crystallizes and is easily separated by filtration. In many instances, it may be desirable to recrystallize from a polar solvent more than once and again, in many instances, particularly when dibasic impurities are not a major problem, the recrystallization step of the amine salt of terephthalic acid may be eliminated in the instant process.

In the above-described step of the instant process, namely, crystallization of the amine salt of terephthalic acid, various polar solvents may be employed, such as water, glycerol, glycols, such as ethylene glycol, propylene glycol, diethylene glycol, and the like, etc. Mixed solvents may also be employed which has the tendency to decrease solubility losses. The added liquid, which may or may not be polar, should be miscible with the polar solvent but should not in and of itself be a solvent for the amine salt of terephthalic acid. For example, acetone may be added to ethylene glycol. The liquid, such as acetone, and the like, may be added to the solution of the amine salt of terephthalic acid in the polar solvent or the polar solvent and liquid may be mixed and the amine salt dissolved therein. When employing mixed solvents, the polar solvent should comprise at least 15 percent of the mixture. Satisfactory results are obtained when the polar solvent is employed in amounts ranging from 15 percent to 50 percent by volume of the mixture and the added liquid is employed in amounts ranging from 50 percent to 85 percent of the mixture.

In a preferred embodiment of the instant invention the conversion of the crude terephthalic acid to an amine salt thereof is accomplished by dissolving the crude acid in a solvent therefor, such as pyridine, and the like, and thereafter adding the theoretical or equivalent quantity of an amine. It is preferred to convert the crude terephthalic acid to an amine salt thereof in the presence of a basic organic solvent. Amines which may successfully be employed in the present invention are isopropylamine and morpholine. The amine salt of terephthalic acid precipitates immediately in substantially quantitative amounts and can thereafter be isolated by filtration. The pyridine, or other solvent employed, is then washed from the isolated amine salt of terephthalic acid by means of acetone, xylene, or other suitable liquid with which the solvent being removed is miscible and in which the amine salt of terephthalic acid is insoluble.

As pointed out hereinbefore, the amine salt of terephthalic acid is dissolved in a solvent therefor, such as water, and the solution acidified. Various acids may be used but preferably, inorganic acids, such as sulfuric, hydrochloric, and the like, are employed. When dissolving the amine salt, any undesirable color present can be removed by adding activated carbon, heating the solution and then filtering. The activated carbon may be employed in amounts ranging from 0.05 to 10.0 parts by weight.

In the salt formation reaction, i. e., during the formation of the amine salt of terephthalic acid, various diluents, such as acetone, benzene, and the like, may be employed in conjunction with the pyridine, or other solvent, to improve mixing and decrease occluded impurities.

In order to more clearly understand the instant invention, the following specific examples are given, it being understood that this is merely intended in an illustrative sense and the invention should not be limited thereby but only insofar as the same may be limited by the appended claims. In the examples, all parts and percent are by weight, unless otherwise indicated.

Example I

One part of crude terephthalic acid was dissolved in 6 parts of pyridine and filtered to remove insoluble impurities. The theoretical quantity (0.71 part) of isopropylamine was added dropwise to the pyridine solution of terephthalic acid. The amine salt of terephthalic acid precipitated almost quantitatively and was isolated by filtration. The pyridine was washed from the amine salt with acetone. The amine salt was then dissolved in hot ethylene glycol (125° C.) and after cooling the solution to approximately 45°–50° C., five volumes of acetone were added to the solution, which gave 83 percent by volume of acetone. The amine salt was then recrystallized by cooling the solution below 45° C. The product was filtered off and then dissolved in 25 parts of distilled water. The aqueous solution was then treated with 0.05 part of activated carbon for 15 minutes and filtered. The amine salt was then converted to the terephthalic acid by adding hydrochloric acid to the filtrate while hot and until the solution became acid. The insoluble terephthalic acid, which precipitated upon the addition of hydrochloric acid, was isolated by filtration and washed free of excess hydrochloric acid and amine chloride with water. A yield of 80% pure terephthalic acid, based on the starting weight of the crude acid, was obtained.

Example II

The procedure outlined in Example I was followed with the exception that 1.05 parts of morpholine was employed in place of the isopropylamine and in addition, xylene rather than acetone was used to wash the amine salt free of pyridine. A yield of 80% pure terephthalic acid, based on the starting weight of the crude acid, was obtained.

Example III

The procedure of Example I was repeated with the exception that the recrystallization of the amine salt was eliminated. That is, the amine salt of terephthalic acid was washed free of pyridine with acetone and then dissolved in distilled water. The aqueous solution was treated with activated carbon, filtered and the amine salt was converted to terephthalic acid by adding hydrochloric acid to the hot filtrate until it became acid. After filtration the terephthalic acid was washed free of excess hydrochloric acid and amine chloride with water. A yield of 94% pure terephthalic acid, based on the starting weight of the crude acid, was obtained.

It has been found that yields of 80 to 95% pure terephthalic acid, based on the starting weight of the crude acid can be obtained in accordance with the process of the instant invention.

The present invention provides a simple and economic method for the purification of terephthalic acid. Terephthalic acid is readily and effectively separated from mono- and dibasic impurities, when employing the instant process. By means of the present invention the high cost of converting terephthalic acid to an ester, for purposes of purification, is eliminated and likewise the need of stainless steel pressure equipment, low equipment capacity, etc., is eliminated.

When employing polar solvents, other than water, the same may be easily recovered by distillation and other well-known procedures and reused.

It will readily be apparent to those skilled in the art that many modifications and variations of the invention, as hereinbefore set forth, may be made without departing from the spirit and scope thereof, and therefore, only such limitations should be imposed as are indicated in the appended claims.

We claim:

1. A process for purifying terephthalic acid comprising, dissolving crude terephthalic acid in pyridine, reacting the crude terephthalic acid, while dissolved in the pyridine, with a compound selected from the group consisting of isopropylamine and morpholine to form an amine salt of terephthalic acid, recrystallizing the amine salt from ethylene glycol, dissolving the amine salt in water, acidifying the aqueous solution of the amine salt, and recovering the purified, insoluble terephthalic acid.

2. The process as defined in claim 1 wherein the aqueous solution of the amine salt is acidified by adding hydrochloric acid thereto.

3. A process for purifying terephthalic acid comprising, dissolving crude terephthalic acid in pyridine, reacting the crude terephthalic acid with isopropylamine by adding the equivalent amount of the amine to the pyridine solution thereby forming an amine salt of the terephthalic acid, recrystallizing the amine salt from ethylene glycol, dissolving the amine salt in water, acidifying the aqueous solution of the amine salt with hydrochloric and, and recovering the purified, insoluble terephthalic acid.

4. A process for purifying terephthalic acid comprising, dissolving crude terephthalic acid in pyridine, reacting the crude terephthalic acid with morpholine by adding the equivalent amount of the amine to the pyridine solution thereby forming an amine salt of the terephthalic acid, recrystallizing the amine salt from ethylene glycol, dissolving the amine salt in water, acidifying the aqueous solution of the amine salt with hydrochloric acid, and recovering the purified, insoluble terephthalic acid.

References Cited in the file of this patent

UNITED STATES PATENTS

| | | |
|---|---|---|
| 2,664,440 | Toland | Dec. 29, 1953 |
| 2,742,496 | Lum et al. | Apr. 17, 1956 |